A. F. BATCHELDER,
LOCOMOTIVE OR CAR.
APPLICATION FILED MAR. 21, 1918.

1,359,861.

Patented Nov. 23, 1920.

Inventor:
Asa F. Batchelder,
by Albert G. Davis
His Attorney.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

LOCOMOTIVE OR CAR.

1,359,861.　　　　　　　Specification of Letters Patent.　　Patented Nov. 23, 1920.

Application filed March 21, 1918.　Serial No. 223,724.

*To all whom it may concern:*

Be it known that I, ASA F. BATCHELDER, a citizen of the United States, residing at Schenectady, in the county of Schenectady, State of New York, have invented certain new and useful Improvements in Locomotives or Cars, of which the following is a specification.

My invention relates to locomotives and cars, and more particularly to electric locomotives. My invention is particularly applicable to those locomotives and cars in which the running gear is divided near the center of the length of the vehicle, the parts of the running gear being movable with respect to each other. The object of my invention is to provide a novel arrangement and construction of the cab or body of the locomotive.

In illustrating and describing my present invention I have also illustrated and described in some detail a certain locomotive construction for which I here make no claim, but which is more completely described and claimed in my copending application Serial No. 291,601, filed April 21, 1919; this copending application being in part a division of the present application. While my present application is particularly applicable to the particular locomotive or car construction of this copending application, it will be understood that my present invention is not limited to this locomotive or car construction.

Figure 1:
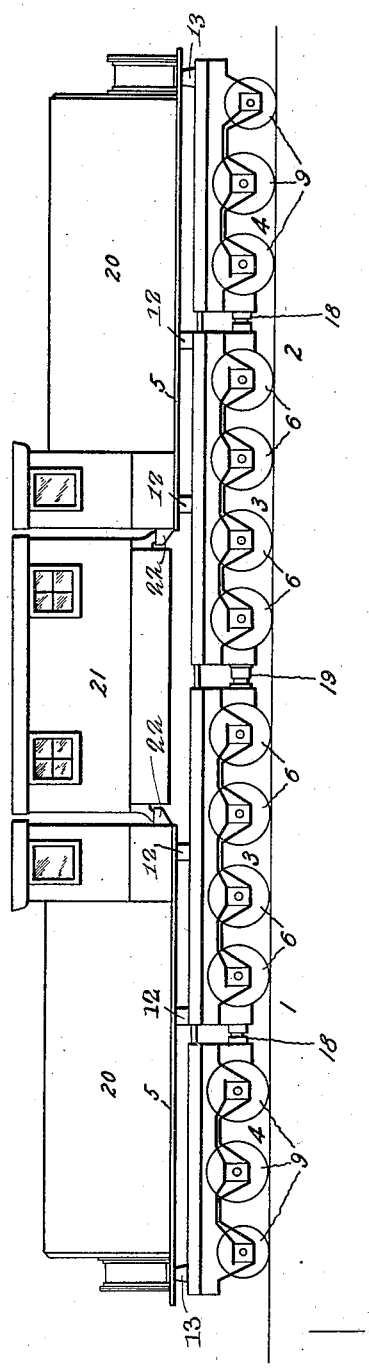
Figure 2:
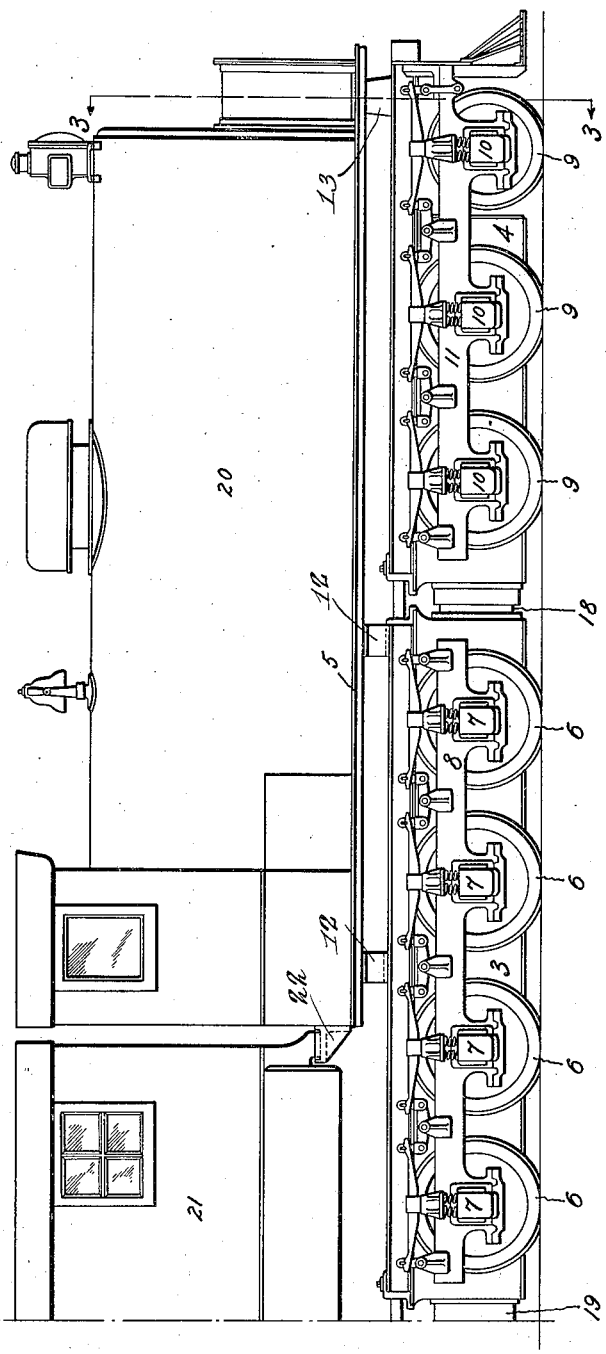

The various features of novelty which characterize my invention are pointed out in the claims annexed to and forming a part of this specification. For a better understanding of my invention reference may be had to the following description taken in connection with the accompanying drawing, in which Figure 1 is a skeleton view of an electric locomotive embodying my invention; and Fig. 2 is a larger side elevation of one-half of the locomotive shown in Fig. 1.

In the locomotive of the accompanying drawing, there are two similar running gear sections, 1 and 2, each of which has mounted thereon two trucks 3 and 4. The trucks 3 are rigidly connected to the car frames 5 and are located nearer the middle of the locomotive than the trucks 4 which are nearer the ends of the locomotive. The trucks 4 are loosely connected to the car frames 5, that is, they may move to a small extent both transversely and vertically with respect to the car frames 5. Each of the trucks 3 has pairs of wheels 6, the axles of which are journaled in journal boxes 7 on which the truck frame 8 is supported. These truck frames 8 are rigidly connected to the car frames 5 by means of supports 12. All of the wheels of these trucks 3 are shown as driving wheels, the axles being supplied with the well known bipolar type of electric motor. Each of the trucks 4 has pairs of wheels 9, the axles of which are journaled in journal boxes 10 on which the truck frame 11 is supported. Only the two inner pairs of wheels of each of these trucks are shown as driving wheels, the pair of wheels at the end of each of these trucks which is at the end of the locomotive are shown as idle or guiding wheels. A suitable support 13 as shown at the outer end of each truck 4, connects each truck 4 to the respective car frame 5 and, as before indicated, the connection is such that some relative transverse and vertical movement between each truck 4 and the adjacent car frame 5 is possible.

A joint 18 is provided between each of the end or guiding trucks 4 and its adjacent truck 3. I have so designed this joint that it is capable of carrying a part of the load of the car frame 5; this permits placing the support between each end or guiding truck 4 and its car frame 5 in any position on the longitudinal center of the guiding truck. If this support is displaced from the center of the truck and is placed, for instance, at the end of the truck 4 remote from the trucks 3 as shown in the drawings, the guiding truck is caused to carry its portion of the load of the superstructure partly through the end support and partly through the joint 18. I also provide a guiding joint 19 between the middle trucks 4. Joint 19, however, does not carry any load, but is so designed as to allow vertical movement between the trucks 3. These joints 18 and 19 contain certain novel features which form the subject matter of my Patent No. 1,310,049, dated July 15, 1919.

It will be seen that the locomotive so far described comprises two running gear sections, each having a truck 4 and a guiding truck 3. The cab or body structure comprises two cab sections 20, each of which is mounted on a running gear section, and a third section 21 located between and carried on supports 22 at the ends of the cab sections 20 and above the car frames 5. The section 21 is preferably mounted so that the running gear sections are free to move angularly with reference thereto. The cab sections 20 are shown as extending over only a portion of each of the running gear sections.

Such a construction of cab permits the use of a single heating plant for the locomotive which is placed in the cab section 21 and supplies heat to both of the cab sections 20, and, if desired, to the rest of the train hauled by the locomotive. This construction also permits the ready removal of section 21 (together with the heating plant or other devices contained therein), and the substitution of another central section if the apparatus contained therein is out of order or the removal is desired for any other reason.

While I have described above the best embodiment of my invention of which I am now aware, it will be understood that this embodiment is merely illustrative and that my invention is not to be limited thereto, but that my invention is set forth in the following claims.

What I claim as new and desire to secure by Letters Patent of the United States, is:

1. A locomotive comprising two running gear sections, a cab section mounted on each running gear section, each of said cab sections extending over only a portion of each of the running gear sections, and a third cab section located between said first-mentioned cab sections.

2. A locomotive comprising two running gear sections, said running gear sections being joined together, a cab section mounted on each running gear section, each of said cab sections extending over only a portion of each of the running gear sections, and a third cab section located between said first-mentioned cab sections.

3. A locomotive comprising two running gear sections, means for joining said running gear sections together, a cab section mounted on each running gear section, a third cab section located between said first-mentioned cab sections, and means on each of said running gear sections for supporting said third cab section.

4. A locomotive comprising two running gear sections, a cab section mounted on each running gear section, each of said cab sections extending over only a portion of each of the running gear sections, and a third cab section located between said first-mentioned cab sections and mounted so that said running gear is free to move angularly with reference thereto.

5. A locomotive comprising two running gear sections, said running gear sections being joined together, a cab section mounted on each running gear section, each of said cab sections extending over only a portion of each of the running gear sections, and a third cab section located between said first-mentioned cab sections and mounted so that said running gear is free to move angularly with reference thereto.

6. A locomotive comprising two running gear sections, means for joining said running gear sections together, a cab section mounted on each running gear section, a third cab section located between said first-mentioned cab sections, and means on said running gear sections for so supporting said third cab section that said running gear is free to move angularly with reference thereto.

In witness whereof, I have hereunto set my hand this 19th day of March, 1918.

ASA F. BATCHELDER.